Oct. 12, 1937.   O. FITZ SIMONS   2,095,324
CAPILLARY VISCOMETER
Filed Jan. 12, 1935   3 Sheets-Sheet 1

INVENTOR
Ogden Fitz Simons
BY
ATTORNEY

Oct. 12, 1937.  O. FITZ SIMONS  2,095,324
CAPILLARY VISCOMETER
Filed Jan. 12, 1935  3 Sheets-Sheet 2

INVENTOR
Ogden Fitz Simons
BY
Bruce K. Brown
ATTORNEY

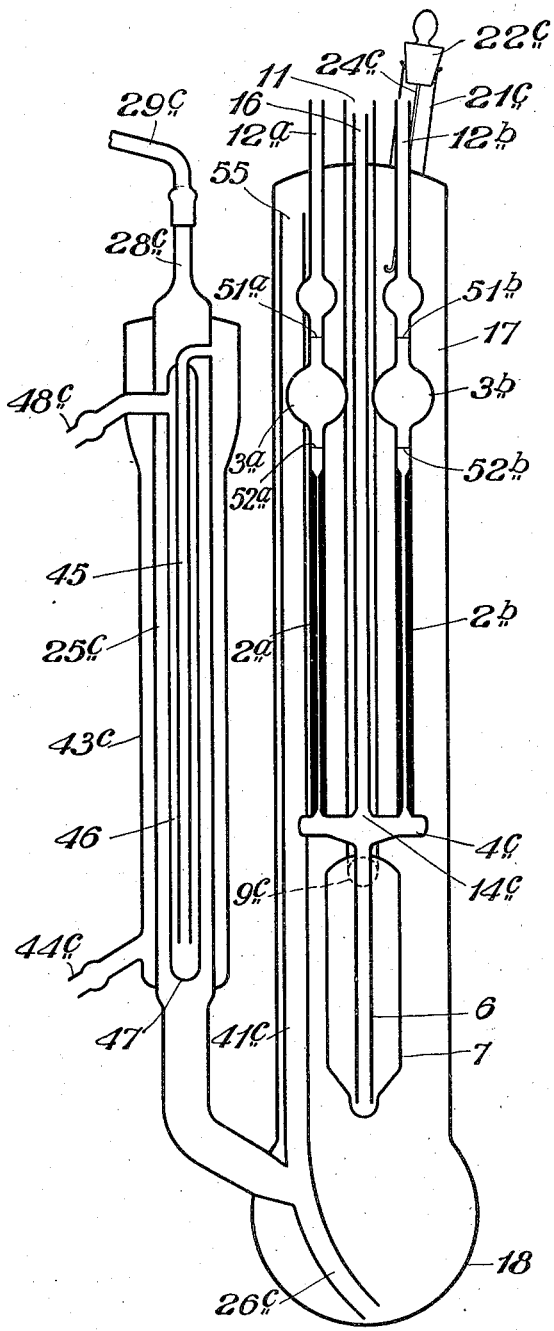
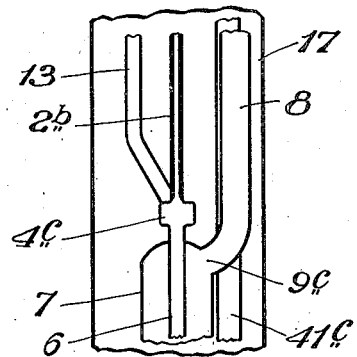
Fig. 4
Fig. 5

Patented Oct. 12, 1937

2,095,324

UNITED STATES PATENT OFFICE 2,095,324

CAPILLARY VISCOMETER

Ogden Fitz Simons, Chicago, Ill., assignor to Standard Oil Company, Chicago, Ill., a corporation of Indiana Application January 12, 1935, Serial No. 1,586

6 Claims. (Cl. 265—11)

This invention relates to improvements in capillary viscometers and more particularly to viscometers employing capillaries constructed to provide a "suspended level".

The "suspended level" as employed in capillaries for various uses provides, in effect, a circular liquid surface that is thinner at the edges than in the middle, such variation and thickness producing a layer of suspended liquid under the circular surface which tends to assume the form of a disk generated by a curved line thus to oppose surface tension with the result that the surface is as nearly level as is possible. Greater accuracy is therefore afforded by capillaries of the "suspended level" type because of the dynamic equilibrium thus obtained which remains substantially constant over a wide viscosity range.

I am aware that capillary viscometers incorporating a "suspended level" have heretofore been used and it is, therefore, an object of my invention to provide certain important improvements therein.

Another object is to provide a capillary viscometer, as described, incorporating a novel means for maintaining liquid to be tested, in and adjacent to the capillary, at an exact predetermined temperature thereby to minimize errors in viscosity determination.

Another object is to provide a viscometer, as described, wherein the removal of the tested liquid from the viscometer is greatly facilitated.

A further object is to provide a viscometer, as described, that will permit of the making of a plurality of determinations of the liquid to be tested in rapid succession and in different capillaries, thereby to facilitate the testing of liquids of unknown viscosities and to provide an ultimate determination based upon most favorable capillary size.

Other objects, the advantages, and uses of the invention will become apparent after reading the following specification and claims and after consideration of the drawings forming a part of the specification wherein:

Fig. 4 is a diagrammatic view of another form of the viscometer; and

Fig. 5 is a fragmentary side elevation of the viscometer of Fig. 4.

Figure 1:
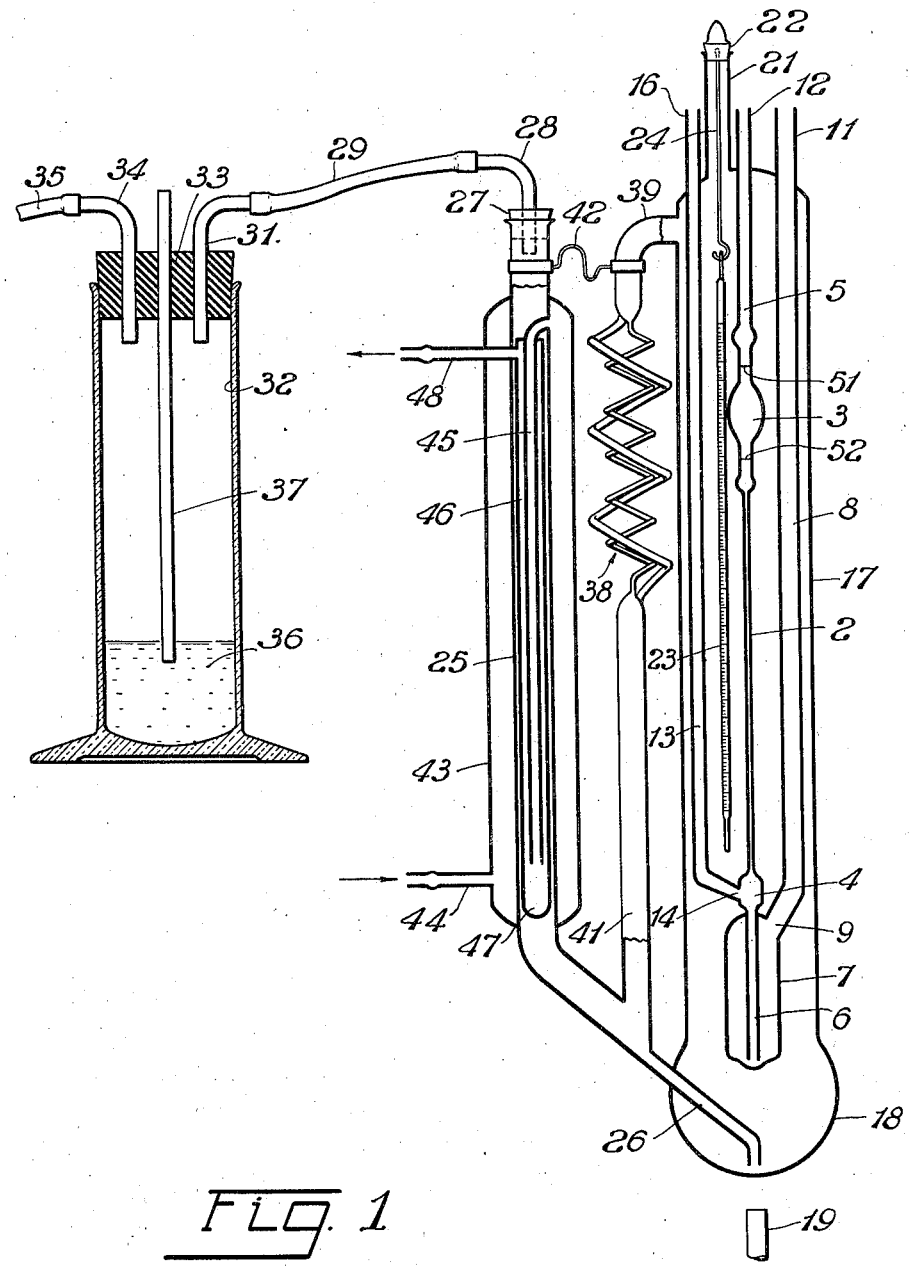
Fig. 1 is a diagrammatic view of a capillary viscometer constructed according to my invention.

In the drawings, I have selected for illustration in Fig. 1, a single tube viscometer, such as may be used for determining the viscosity of petroleum oils and similar viscous liquids. The viscometer shown comprises a single glass unit, with the exception of the removable stopper from which a thermometer may be suspended, although, if desired, the unit may obviously be constructed of separate glass elements with suitable inter-connecting and assembly members.

Figures 2, 3:
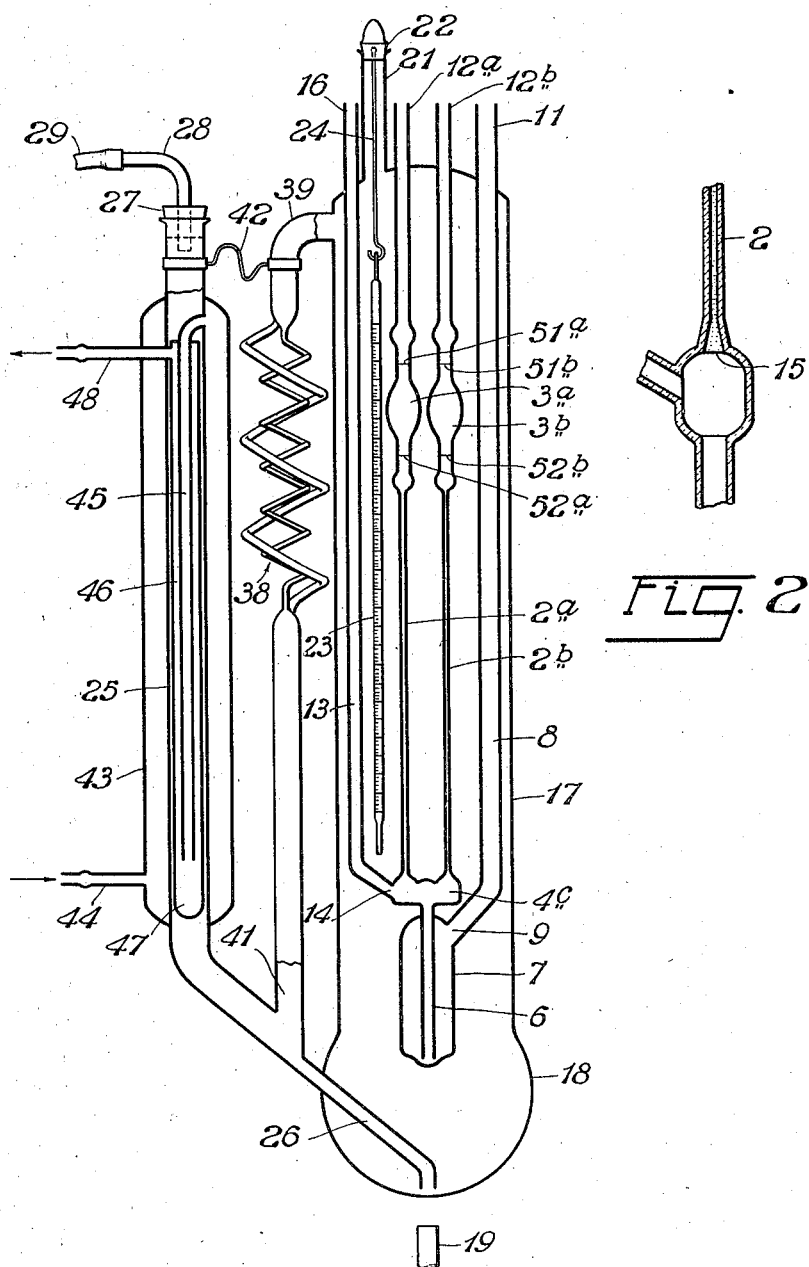
Fig. 2 is a fragmentary sectional view of the capillary tube of the instrument of Fig. 1.
Fig. 3 is a view similar to Fig. 1 of a multicapillary viscometer.

With reference to Fig. 1, the instrument may comprise an upright capillary 2 having a feeder bulb 3 at its upper end and terminating at its lower end in a drop-level bulb 4, illustrated in detail in Fig. 2. A tubular extension 5 is provided at the upper end of the bulb 3 and may extend upwardly therefrom for a distance of approximately 3 or 4 inches. A relatively short tubular member 6 in axial alignment with the capillary tube 2 communicates at its upper end with the bottom of the drop-level bulb 4 for a purpose hereinafter described. A liquid receiving bulb 7 surrounds the tube 6 and is formed to provide a liquid capacity slightly greater than the aggregate capacity of the feeder bulb 3, the capillary 2, the drop-level bulb 4 and the tube 6. The bottom wall of the receiving bulb 7 is preferably located close to the lower end of the tube 6. A filler tube 8, located adjacent to the capillary 2 and parallel therewith, communicates at its lower end 9 with the upper end of the receiving bulb 7 and has its upper end 11 preferably level with the upper end 12 of the tube 5. The diameter of the filler tube 8 is preferably greater than the diameter of the tubular members 5 and 6 so as to facilitate the flow of liquids therethrough during admission and removal of such liquids to and from the viscometer.

An upright flushing tube 13, extending parallel with the capillary 2 and filler tube 8, communicates at its lower end 14 with the drop-level bulb 4 at a point intermediate the "suspended level" 15 (as shown in Figure 2), formed at the bottom of the capillary during the functioning of the viscometer, and the adjacent mouth of the tube 6. The flushing tube 13 is preferably located upon that side of the capillary 2 opposite to the filler tube 8 and its upper end 16 may extend upwardly and level with the upper ends 11 and 12 of the filler tube 8 and tubular member 5, respectively.

A glass vapor cell 17 entirely surrounds the assembly thus described, with the exception of the uppermost ends of the filler tube 8, tubular member 5, and flushing tube 13, thereby to form a chamber within which hot vapors may be confined to maintain the temperature of the viscometer and liquid therein at a predetermined value. The lower end of the cell 17 terminates in a bulb 18 within which a liquid having a boiling point approximating the temperature at which the apparatus is to be maintained is placed. Heating means, such as Bunson burner 19, may be employed to boil the liquid within the portion 18 of the vapor cell 17.

A tubular neck 21 formed in the upper end of the cell 17 and provided with a stopper 22 affords a ready means for the introduction of a thermometer 23 within the vapor cell and also facilitates the flushing and cleaning of the cell when required. A wire hanger 24 may be fixed to the stopper 22 from which the thermometer 23 may be suspended. In the instrument illustrated the height of the cell 17 containing the viscometer proper is substantially 16 inches and the diameter of the cell approximately 2½ inches.

In order to maintain the vapor within the cell 17 at an exact predetermined temperature, a pressure connecting tube 25 is provided having one end 26 extending downwardly into the bulbular extension 18 of the cell to a point beneath the liquid level. The tube 25 may extend parallel with the axis of the cell 17 at a distance of substantially 2 inches therefrom and may be formed with a lip at its upper end, within which a stopper 27 having a glass tube 28 extending therethrough is received. The tube 28 may be connected as by a rubber hose 29 with the intake tube 31 of a pressure control chamber 32. The chamber 32 may comprise a glass jar closed with a stopper 33 through which extend the tube 31 and a tube 34 adapted for connection as through a tube 35 with the intake of a suction pump (not shown). A liquid, such as mercury 36, contained within the chamber 32, provides a medium by which a predetermined pressure differential between the vapors in the cell 17 and the suction pump may be maintained thereby to lower the boiling point of the liquid within the bulb 18 of the vapor cell so as to regulate the temperature of the vapor thus evolved by the boiling liquid. To this end a central glass tube 37 slidably mounted through the stopper 33 and submerged at its lower end within the mercury 36 serves to admit only enough air to the chamber to maintain the correct pressure differential. Vertical movement of the tube 37 operates, therefore, to attain any degree of suction within reasonable limits within the pressure connecting tube 25. If desired, other liquids than mercury may be employed in the pressure control chamber 32, although I prefer to use liquids which will not absorb condensate from any vapors which may enter the pressure control chamber.

In order to minimize the loss of vapor-producing liquid and to reduce the amount of vapors which might otherwise pass into the pressure control chamber 32, I provide an air condenser 38 communicating at 39 with the upper end of the vapor cell 17 and at 41 with the lower end of the pressure connecting tube 25 adjacent to the portion 26 thereof. This arrangement results in the removal of non-condensible vapors from the upper end of the vapor cell 17, as well as some condensation of vapors and return of the condensate to the bulb 18. It will be noted that the relatively fragile glass condenser 38 is located between the cell 17 and the pressure connecting tube 25, thus to benefit by the protection of the latter members against breakage of the condenser by handling. A resilient metal link 42 may be disposed between the upper ends of the condenser tube and the pressure connecting tube 25 thereby to provide mutual support for the two members through which strains arising by virtue of unequal linear expansion of the members may not be transmitted.

A water condenser may be incorporated within and about the pressure connecting tube 25 so as to assure condensation of any vapors which might otherwise find their way into the pressure control chamber 32. This condenser, as illustrated, may comprise an elongated condenser cell 43 surrounding the major portion of the pressure connecting tube 25 and having an inlet 44 through which cold water is admitted, an elongated tube 45 communicating with the upper end of the condenser cell 43 and extending downwardly and along the axis of the tube 25, an inner water cell 46 surrounding the tube 45 and receiving water therefrom at its lower and closed end 47, and an outlet tube 48 at the upper end of the cell 46 through which water from the condenser is discharged.

The viscometer thus described comprises, in substantial unit-assembly, a highly efficient and accurate instrument for the determination of viscosity by observation of time and the movement of liquid to be tested with respect to but one indicating zone defined by hair lines 51 and 52 adjacent to the upper and lower ends respectively of the feeder bulb 3.

In operation the instrument is prepared for use by admitting liquid to be tested through the open and upper end 11 of the filler tube 8 in an amount sufficient to fill the receiving bulb 7. Heat from the burner 19 may thereupon be applied to the liquid in the bulbular extension 18 of the vapor cell 17 until the thermometer 23 registers the exact temperature at which the viscosity test is to be made. A sufficient time should be allowed for the liquid within the receiving bulb 7 to arrive at the temperature of the vapor within the cell 17. During this phase of operation the tube 37 of the pressure control chamber 32 may be regulated so as to obtain the proper boiling temperature for the liquid within the portion 18 of the vapor cell.

It should be noted that if a suction pump is to be employed for connection with the tube 34 of the pressure control chamber that the boiling point of the liquid placed within the vapor cell should be higher than the temperature to be maintained during the viscosity test. If desired, however, a liquid may be employed having a boiling point which is lower than the required test temperature and in such case a pressure pump may be substituted for the suction pump.

Subsequent to the establishment of the required operating temperature within the vapor cell 17 of the instrument, the liquid from the receiving bulb 7 may be drawn upwardly so as to fill the drop-level bulb 4, the capillary 2 and the feeder bulb 3 to a point above the level of the hair line 51. This may be done by placing the finger over the normally open end 16 of the flushing tube 13 and applying suction, as through a rubber hose, to the upper end 12 of the tubular member 5. This simple procedure coupled by removing the finger from the upper end 16 of the flushing tube prepares the instrument for viscosity determination. Immediately upon release of the finger from the tube 13, as described, the liquid within the drop-level bulb 4 and a small portion of the liquid which may have found its way into the mouth of the flushing tube 13 will fall through the tube 6 into the receiving bulb 7 leaving the liquid within the capillary 2 and the feeder bulb 3. At this time the suspended level 15, illustrated in Fig. 2, is established and, as pointed out, comprises a surface that is for practical purposes without a meniscus peculiar to the viscosity of the liquid, such as that ordinarily existing at the orifice of the conventional viscometer. Upon releasing the rubber tube, applied to the capillary extension 5, which may be held pinched together by the hand of the operator during the dropping of the surplus liquid, as described, the liquid within the feeder bulb 3 will flow downwardly through the capillary and the time during which the meniscus passes between the hair lines 51 and 52 taken with the capillary diameter provides the mathematical values from which the true viscosity of the liquid may be computed. If desired, the viscosity test may be repeated without altering the instrument in order to obtain an additional check upon the determination first made by again withdrawing a sufficient amount of liquid from receiving bulb 7 into the drop-level bulb, the capillary 2 and the feeder bulb 3, as previously described, and thereafter releasing the surplus liquid for time determinations in the passage of the meniscus between the hair lines 51 and 52.

After the instrument has thus been used and it is desired to prepare it for other tests, the removal of all the liquid is greatly facilitated by the simple expedient of tipping the glass unit upon its side and thus permitting the liquid to flow out through the feeder tube 8, or by applying suction to the upper end 12 of tube 5 and closing the upper end 16 of flushing tube 13 thereby removing substantially all of the liquid in the receiving bulb 7 through the tube 6, capillary tube 2, feeder bulb 3 and tube 5. As an alternative method of cleaning the apparatus suction may be applied to the upper end 16 of flushing tube 13, and closing the upper end 12 of tube 5. By this means the apparatus may be cleaned out without the necessity of dismantling the same after each determination. Flushing liquid, such as naphtha, where the liquid tested is a petroleum product, may be introduced through the flushing tube 16 thus to thoroughly cleanse the walls of the drop-level bulb and the capillary. Such liquid may also be drawn upwardly through the capillary and blown back for complete cleansing of the capillary walls. Cleansing liquid may likewise be removed through the filler tube 8.

In Fig. 3, I have shown another form of my improved viscometer differing from the form illustrated in Fig. 1 only by the inclusion thereof of a plurality of capillaries (in the instrument shown I have illustrated two capillaries) thus, improving upon the usefulness of the instrument for viscosity determinations with respect to liquids of unknown viscosity. With a single tube viscometer, considerable time may be lost in choosing one having a tube of proper capillary diameter to give accurate determination where the viscosity of the liquid being tested is unknown to the operator. The two capillary tubes of the apparatus of Fig. 3 differ only in diameter of the capillary bore and are represented by reference numerals corresponding to the reference numerals of Fig. 1 with the suffix "a" and "b" respectively. The lower ends of both of the capillaries communicate with a common drop-level bulb 4c. In all other respects, the apparatus may be identical to that described in connection with the apparatus of Fig. 1.

In operation, the operator, after preparing the instrument to provide the required exact pre-determined temperature within the cell 17 may select either one of the two capillaries for the first determination, using his best judgment with respect to the capillary size. Should it be found that the time required for the movement of the meniscus between the hair lines at the feeder bulb is inconsistent with accurate results he may immediately thereafter draw the liquid into the other capillary and repeat the test.

While I have illustrated in Fig. 3 a viscometer containing two capillary tubes within a common vapor cell 17, it should be understood that this number may be increased to as many as desired in consistency with the expected requirements which the instrument is to meet. However, since viscometers are for the most part employed for specialized purposes, it is very likely that not more than three such capillary tubes in a single instrument may be needed.

In Figures 4 and 5 I have illustrated another form of the viscometer, the features of which may be embodied in a single or multiple capillary device. In the drawings 2a and 2b are shown similar to those of Fig. 3. The principal difference between the viscometer of Fig. 4 and that of Fig. 3 lies in the limitation of the so-called condenser portion 38 through which non-condensible vapors may be removed from the cell 17 and wherein a measure of condensation may take place. In lieu of this structure I have incorporated in the device of Fig. 4 a tube 41c comparable to the tube 41 of Fig. 3 which rises upwardly within the vapor cell from the portion 26c of the pressure connecting tube 25c to a point near the top of the cell as indicated at 55. The upper end of the tube 41c is open so that vapors may be removed from the upper portion of the cell 17 and drawn downwardly and into the pressure connecting tube 25c within the water condenser cell 43c. The structure of the water condenser is modified in minor aspects by the slanting of the water inlet and outlet tubes 44c and 48c respectively and the upper end of the cell 43c is somewhat enlarged to accommodate an increased quantity in the cooling liquid. The rubber tube 29c from the pressure regulating chamber may be connected directly to a reduced portion 28c formed at the upper end of the pressure connecting tube 25c.

In order to properly accommodate the tube 41c within the vapor cell 17 in the device of Fig. 4 I have changed the positions of flushing tube 13 and filler tube 8 with respect to the capillary tubes and the drop-level bulb 4c. As indicated in Fig. 5 the filler tube 8 joins bulb 7 at 9c, a point midway between the parallel capillary tubes. The flushing tube likewise joins the drop-level bulb 4c at a point between suspended levels of the tube capillaries. I have also relocated the neck 21c through which the thermometer may be inserted as indicated in Fig. 4.

In operation the device of Figs. 4 and 5 functions precisely after the manner described in connection with Fig. 3. An added advantage is attained, however, due to the elimination of the expansion coil of the so-called condenser 38, which is a relatively fragile device, and likely to become damaged.

While I have presented herein certain embodiments of my invention by description and illustration of the detailed structures thereof, it is to be understood that such disclosure is for the purpose of illustration only and that the scope of my invention is to be limited only by the appended claims.

I claim:

1. A viscometer, comprising, in combination, an upright capillary tube terminating at its lower end in a drop-level bulb, the bore of said capillary tube being fashioned, at its lower end, to effect a suspended level of liquid within the bore of the tube, a feed bulb at the upper end of said capilliary tube, means facilitating quantitative measurement of liquid flowing through the tube, a vapor chamber surrounding said tube, said feed bulb and said drop-level bulb, and having a space in its lower end for containing liquid to produce hot vapor when heated to its boiling point, and means for controlling the pressure in said vapor chamber to regulate at will the boiling temperature of said vapor producing liquid.

2. A viscometer, comprising, in combination, an upright capillary tube terminating at its lower end in a drop-level bulb, the bore of said capillary tube being fashioned at its lower end to effect a suspended level of liquid within the bore of the tube, a feed bulb at the upper end of said capillary tube, means facilitating quantitative measurement of liquid flowing through the tube, a vapor chamber surrounding said tube, said feed bulb and said drop-level bulb, and having a space in its lower end for containing liquid to produce hot vapor when heated to its boiling point, means for controlling the pressure in said vapor chamber to regulate at will the boiling temperature of said vapor producing liquid, and a condenser associated with said vapor chamber for condensing vapors from the top of said chamber and for returning the condensate to said liquid confining space.

3. A viscometer comprising, in combination, an upright capillary tube terminating at its lower end in a drop-level bulb, the bore of said capillary tube being fashioned at its lower end to effect a suspended level of liquid within the bore of the tube, a feed bulb at the upper end of said capillary tube, means facilitating quantitative measurement of liquid flowing through the tube, a flushing tube connected to said drop-level bulb, a receiving bulb located beneath said drop-level bulb having a capacity greater than said capillary tube, said feed bulb and said drop-level bulb, a filling tube connected to said receiving bulb, a vapor chamber surrounding said capillary tube, said feed bulb, said drop-level bulb, a major portion of said filling tube, a major portion of said flushing tube, and said receiving bulb, said vapor chamber having a space in its lower end for liquid to produce hot vapor when heated to its boiling point, means for controlling the pressure in said vapor chamber to regulate at will the boiling temperature of said vapor producing liquid, a condenser, said condenser associated with said vapor chamber for condensing vapors from the top of said chamber and for returning the condensate to said liquid confining space, a second condensing means, said second condensing means associated with said vapor chamber and said pressure controlling means, for condensing vapors escaping to said controlling means and returning the condenser vapors to said vapor chamber.

4. A viscometer comprising, in combination, a plurality of upright capillary tubes of different capillary bores each terminating at its lower end in a common drop-level bulb, the bores of the capillary tubes being fashioned at their lower ends to effect a suspended level of liquid within the bores of the tubes, a feed bulb at the upper end of each of said capillary tubes, means facilitating quantitative measurement of liquid flowing through the tubes, a vapor chamber surrounding said tubes, said feed bulbs and said drop-level bulbs, and having a space in its lower end for containing liquid to produce hot vapor when heated to its boiling point, and means for controlling the pressure in said vapor chamber to regulate at will the boiling temperature of said vapor producing liquid.

5. A viscometer comprising, in combination, a plurality of upright capillary tubes of different capillary bores each terminating at its lower end in a common drop-level bulb, the bores of the capillary tubes being fashioned at their lower ends to effect a suspended level of liquid within the bores of the tubes, a feed bulb at the upper end of each of said capillary tubes, means facilitating quantitative measurement of liquid flowing through the tubes, a vapor chamber surrounding said tubes, said feed bulbs and said drop-level bulbs, and having a space in its lower end for containing liquid to produce hot vapor when heated to its boiling point, and means for controlling the pressure in said vapor chamber to regulate at will the boiling temperature of said vapor producing liquid, and a condenser associated with said vapor chamber for condensing vapors from the top of said chamber and for returning the condensate to said liquid confining space.

6. A viscometer comprising, in combination, a plurality of upright capillary tubes of different capillary bores each terminating at its lower end in a common drop-level bulb, the bores of the capillary tubes being fashioned at their lower ends to effect a suspended level of liquid within the bores of the tubes, a feed bulb at the upper end of each of said capillary tubes, means facilitating quantitative measurement of liquid flowing through the tubes, a vapor chamber surrounding said tubes, said feed bulbs and said drop-level bulbs, and having a space in its lower end for containing liquid to produce hot vapor when heated to its boiling point, and means for controlling the pressure in said vapor chamber to regulate at will the boiling temperature of said vapor producing liquid, a condenser, said condenser associated with said vapor chamber for condensing vapors from the top of said chamber and for returning the condensate to said liquid confining space, a second condensing means, said second condensing means associated with said vapor chamber and said pressure controlling means, for condensing vapors escaping to said controlling means and returning the condensed vapors to said vapor chamber.

OGDEN FITZ SIMONS.